United States Patent
Bregler et al.

(10) Patent No.: US 11,163,733 B2
(45) Date of Patent: Nov. 2, 2021

(54) DEPLOYMENT OF AUTOMATED MIGRATIONS FOR DATABASE TABLES

(71) Applicant: SAP SE, Walldorf (DE)

(72) Inventors: Jonathan Bregler, Kraichtal (DE); Alexander Bunte, Heidelberg (DE); Andreas Kellner, Birkenau-Loehrbach (DE); Simon Lueders, Walldorf (DE); Arne Harren, Walldorf (DE)

(73) Assignee: SAP SE, Walldorf (DE)

( * ) Notice: Subject to any disclaimer, the term of this patent is extended or adjusted under 35 U.S.C. 154(b) by 171 days.

(21) Appl. No.: 16/695,770

(22) Filed: Nov. 26, 2019

(65) Prior Publication Data

US 2021/0157776 A1 May 27, 2021

(51) Int. Cl.
*G06F 16/21* (2019.01)

(52) U.S. Cl.
CPC .................... *G06F 16/213* (2019.01)

(58) Field of Classification Search
CPC ..................................................... G06F 16/213
See application file for complete search history.

(56) References Cited

U.S. PATENT DOCUMENTS

2007/0055692 A1* 3/2007 Pizzo .................... G06F 16/289

OTHER PUBLICATIONS

Code First Migrations in Team Environments, Microsoft Docs, Published Oct. 23, 2016, https://docs.microsoft.com/en-US/ef/ef6/modeling/code-first/migrations/teams (Year: 2016).*

Holleran, "How to Update Your Database Structure in Entity Framework", Published: Feb. 21, 2018; https://www.pauric.blog/Database-Updates-and-Migrations-with-Entity-Framework/. (Year: 2018).*

* cited by examiner

*Primary Examiner* — Jay A Morrison
(74) *Attorney, Agent, or Firm* — Schwegman Lundberg & Woessner, P.A.

(57) ABSTRACT

In an example embodiment, a new development infrastructure is provided that provides an external repository for database definitions. The development infrastructure also then includes a development mode. When using the development mode, the behavior of the development infrastructure is modified to better fit the development of database artifacts. The developer uses a development base version of a definition (usually the latest released version of the definition) but also creates migrations that indicate how the development base version should be modified to arrive at the developer's intended new definition. While still in development mode, the deployment may be run, which causes data in the development mode that uses the old definition to be dropped and replaced by the base version. The development mode then executes the specified migrations.

17 Claims, 7 Drawing Sheets

DEPLOYMENT OF AUTOMATED MIGRATIONS FOR DATABASE TABLES

TECHNICAL FIELD

This document generally relates to systems and methods for use in database development and modification. More specifically, this document relates to the deployment of automated migrations for database tables.

BACKGROUND

Database design and creation involves the creation of definitions of data structures used in the database. For example, if the data structure is a table, a developer may create a definition of the table that defines the number of columns, the names of each column, and the format of the data stored in each column.

Traditionally, these definitions are stored in a repository within the database itself. When a developer needs to alter one or more of the definitions, he or she would perform the modification on the definition in the repository.

There are several problems with this approach, however. First of all, if the developer submits a new version of a definition that the developer later discovers is undesirable, it may be impossible for the developer to return to the older version of the definition as the underlying database data structures have already been modified to be consistent with the new definition.

Second of all, the traditional approach does not factor in the possibility that multiple developers may wish to simultaneously or near-simultaneously provide new versions of a definition. In such instances, the developers may wind up blocking each other, as the automated tool may be unable to reconcile changes from two different developers simultaneously.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a new development infrastructure is provided that provides an external repository for database definitions. The development infrastructure also then includes a development mode. When using the development mode, the behavior of the development infrastructure is modified to better fit the development of database artifacts. The developer uses a development base version of a definition (usually the latest released version of the definition) but also creates migrations that indicate how the development base version should be modified to arrive at the developer's intended new definition. While still in development mode, the deployment may be run, which causes data in the development mode that uses the old definition to be dropped and replaced by the base version. The development mode then executes the specified migrations. In this context, the term "dropped" shall be interpreted to mean not used anymore, although in some example embodiments dropping may further include deleting the data in the development mode that uses the old definition.

The developer is then able to test the new version of the table by deploying it in the development mode, without affecting any actual data in the database since the database instance used in the development mode is only used for testing.

In cases where multiple developers work on the same definition simultaneously, they use the same base version for developing new migrations. Once one developer finishes his or her changes, they are added to a version control application. When other developers then synchronize with the version control application, they then get these changes and can combine their own changes with them. Because the deployment always reverts to the base version during development, the developers can easily go on working on their own migrations.

In order to ensure that the defined migrations work correctly, in an example embodiment the development infrastructure compares a migrated data structure formed by applying the specified migrations to the development base version with a data structure formed using the current definition. If there is a mismatch, the migrations are rolled back.

Figure 1:
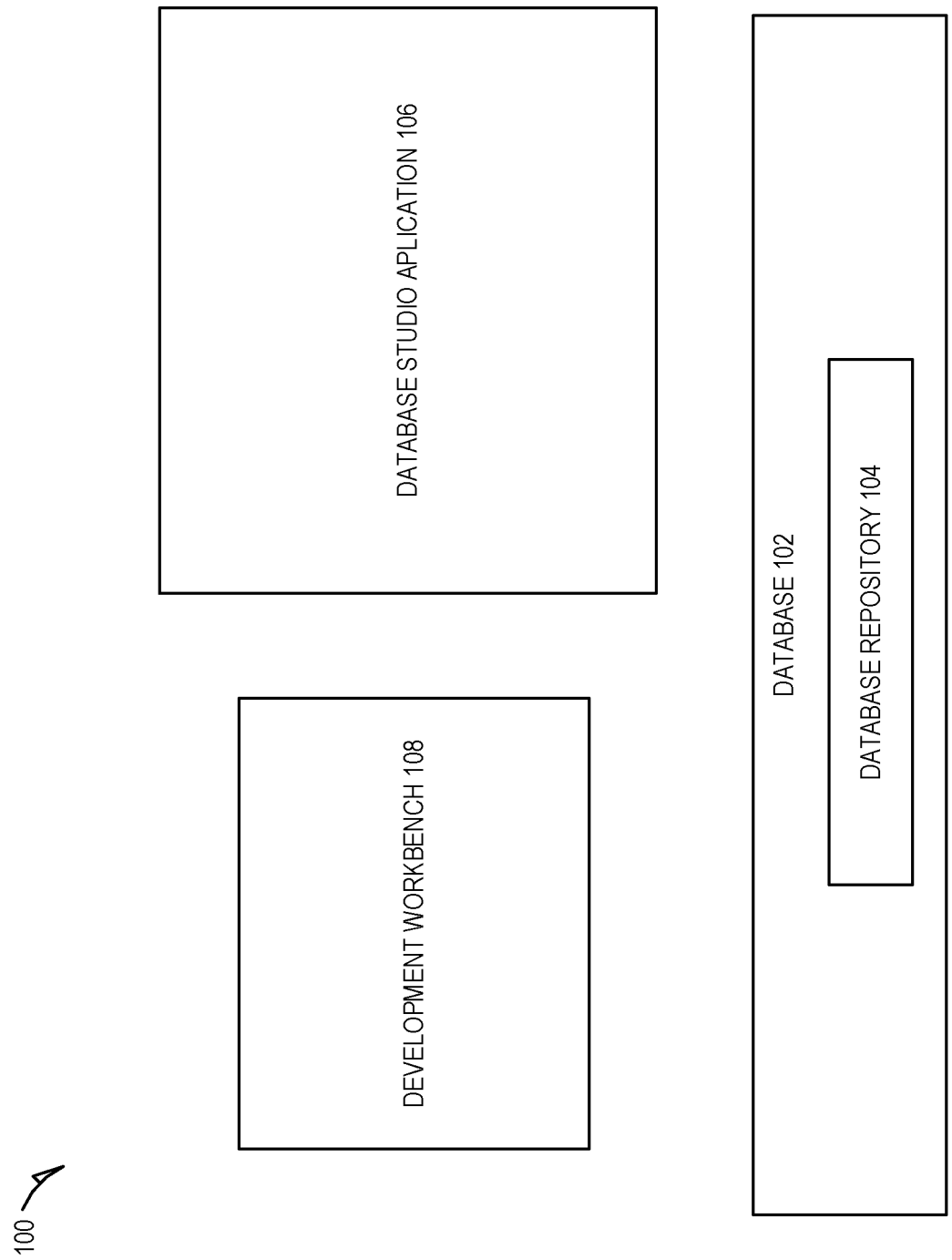
FIG. 1 is a block diagram illustrating a traditional system for database development.

FIG. 1 is a block diagram illustrating a traditional system 100 for database development. Here, database 102 contains a database repository 104. A Database studio application 106 with an associated development workbench 108 allows a developer to create and modify definitions for data structures for the database 102. Those definitions are stored in the database repository 104.

Figure 2:
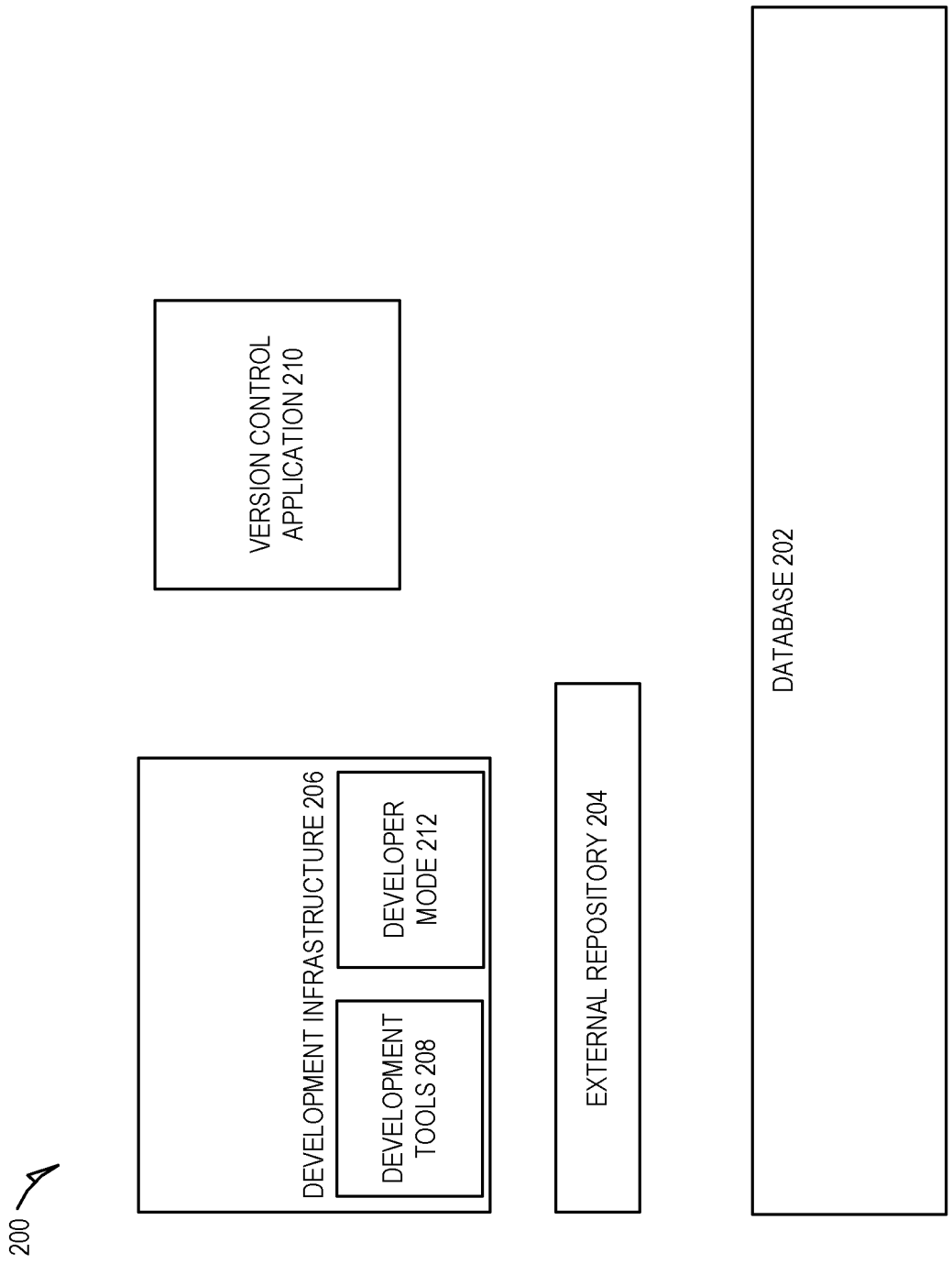
FIG. 2 is a block diagram illustrating a system for database development in accordance with an example embodiment.

FIG. 2 is a block diagram illustrating a system 200 for database development in accordance with an example embodiment. Here, database 202 does not contain the repository, but rather an external repository 204 stores the definitions for data structures for the database 202. A development infrastructure 206 provides development tools 208 for developers to develop and maintain the database 202, including mechanisms to create and modify data structure definitions. A version control application 210 tracks changes to these definitions and can distribute them to different developers.

As stated earlier, in an example embodiment, the development infrastructure 206 additionally includes a developer mode 212 that provides a way for developers to specify migrations in database definitions and to test and verify that these migrations will operation properly (either with or without migrations specified by other developers) prior to the database definition being implemented in the external repository 204.

Once created by a developer, the migrations may be stored in migration tables that are defined in a special file format containing the current data structure definition, the corresponding migrations, and the base version for development. Upon first deployment of the migration table, the corresponding database data structure is created in the most recent version and the version number stored in the development infrastructure metadata. When deploying newer versions later, the development infrastructure retrieves the stored version and consecutively executes the migrations, starting from those associated with one version subsequent to the current version, up to the newest version. The new version number for the data structure is then stored in the metadata.

As an example, assume the data structure is a table of persons, which in the first version only stores the first name and last name:

```
table PERSON      (FIRSTNAME    varchar(100),
                   LASTNAME     varchar(100))
```

Then the developer decides that in the next version also the addresses shall be stored, so she adds street and city columns to the table:

```
table PERSON      (FIRSTNAME    varchar(100),
                   LASTNAME     varchar(100),
                   STREET       varchar(100),
                   CITY         varchar(100))
```

He also writes the statements which transform existing instances of the version 1 to version 2:

```
alter table PERSON add (STREET varchar(100))
alter table PERSON add (CITY varchar(100))
```

After having done some testing with version 2 and also extending an application using the table for the new version, the developer realizes that one hundred characters are not always sufficient for storing the street name and he also needs the house number to be stored separately. So he changes the definition again:

```
table PERSON      (FIRSTNAME    varchar(100),
                   LASTNAME     varchar(100),
                   STREET       varchar(200),
                   HOUSENUMBER  int,
                   CITY         varchar(100))
```

Now the table in his test system needs to be migrated again. One possibility would be to declare it as version 3 and add the migration statements:

```
alter table PERSON alter (STREET varchar(200))
alter table PERSON add (HOUSENUMBER int)
```

However in productive systems it would be inefficient to first add the column STREET and then alter it to allow longer street names. A more efficient migration would be to create the column directly with the larger size, but this would not be deployable in the test system, where the column has already been added:

```
alter table PERSON add (STREET varchar(200))
alter table PERSON add (HOUSENUMBER int)
alter table PERSON add (CITY varchar(100))
```

In case another developer at the same time added the column PHONENUMBER in version 2, he has a different (incompatible) version 2 deployed in his test system than the first developer has. So one of the developers would need to first reset his or her test system in order to be able to go on developing and make his or her version 2 to a version 3 based on the other developer's version 2.

Using the development mode, however, the developer would not need to write version 3 including the new migrations but instead would add version 1 as the development base version and modify the migrations that the other developer had provided (when the other developer was developing version 2) to make a new version 3. Then the developer can deploy the table again in the test system and check if the changed migration works as intended.

Thus, where multiple developers work on the same table definition simultaneously, they use the same base version for developing new migrations. Once one developer finishes the changes, they are added to the version control application. When the other developers then synchronize with the version control application, they get these changes and can combine their own changes with them. Because the deployment always reverts to the base version during development, the developers can easily go on working on their own migrations.

As described earlier, a specialized file format is used to store the definitions and the migrations. In an example embodiment, the specialized file format is as follows:

```
== version = <current version>
table <name> (<column>...)
== migration = <to version>
alter table <name> ...
...
development_version = <base version>
table <name> (<column>...)
```

Thus, the specialized file format files for the earlier version examples would be:

Version 1

```
== version = 1
table PERSON      (FIRSTNAME    varchar(100),
                   LASTNAME     varchar(100))
```

Version 2

```
== version = 2
table PERSON      (FIRSTNAME    varchar(100),
                   LASTNAME     varchar(100),
                   STREET       varchar(100),
                   CITY         varchar(100))
== migration = 2
alter table PERSON add (STREET varchar(100))
alter table PERSON add (CITY varchar(100))
```

-continued

```
Version 3

== version = 3
table PERSON      (FIRSTNAME        varchar(100),
                   LASTNAME         varchar(100),
                   STREET           varchar(200),
                   HOUSENUMBER      int,
                   CITY             varchar(100))
== migration = 2
alter table PERSON add (STREET varchar(100))
alter table PERSON add (CITY varchar(100))
== migration = 3
alter table PERSON alter (STREET varchar(200))
alter table PERSON add (HOUSENUMBER int)
Refined version 2 with development base == version = 2
table PERSON      (FIRSTNAME        varchar(100),
                   LASTNAME         varchar(100),
                   STREET           varchar(200),
                   HOUSENUMBER      int;
                   CITY             varchar(100))
== migration = 2
alter table PERSON add (STREET varchar(200))
alter table PERSON add (HOUSENUMBER int)
alter table PERSON add (CITY varchar(100))
== dev-version = 1
table PERSON      (FIRSTNAME        varchar(100),
                   LASTNAME         varchar(100))
```

Figure 3:
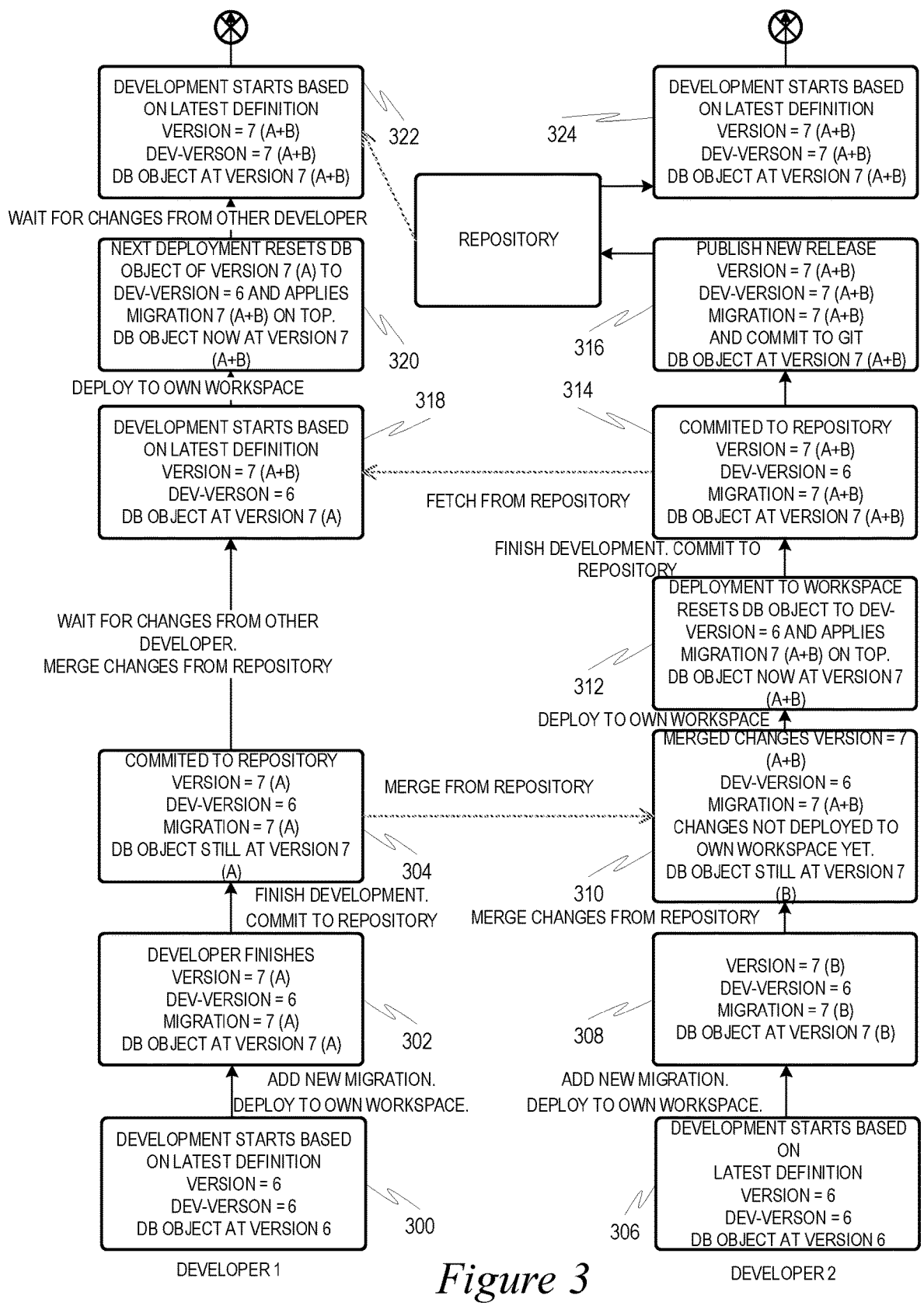
FIG. 3 is a flow diagram illustrating an example of the development process using the development mode, in an example embodiment.

FIG. 3 is a flow diagram illustrating an example of the development process using the development mode, in an example embodiment. There are two developers, developer 1 and developer 2. At operation 300, developer 1 begins development based on the latest definition, which is version 6. At operation 302, developer 1 adds a new migration and deploys it to his own workspace, resulting in version 7(a) of the definition. At operation 304, developer 1 finishes development and commits the definition and migrations to the repository.

Independently, at operation 306, developer 2 begins development based on the latest (official) definition, which is still version 6. At operation 308, developer 2 adds a new migration and deploys it to his own workspace, resulting in version 7(b) of the definition. At operation 310, changes from developer 1's version (version 7(a)) are merged with developer 2's version, resulting in a combined version 7(a+b) and combined migrations 7(a+b). Developer 2 then deploys the migrations and definition to his own workspace at operation 312. Once development is finished, it is then committed to the repository at operation 314.

At operation 316, the new release, version 7(a+b), is published to the repository. Should developer 1 then decide to do further work on the definition, at operation 318 the development may start based on the latest definition (which is version 7(a+b)). At operation 320 developer 1 may deploy the new definition and migrations to his own workplace. This deployment resets the database object of version 7(a) to the prior version 6 and then applies the new migration 7(a+b) on top, which brings the database object to version 7(a+b).

Figure 4:
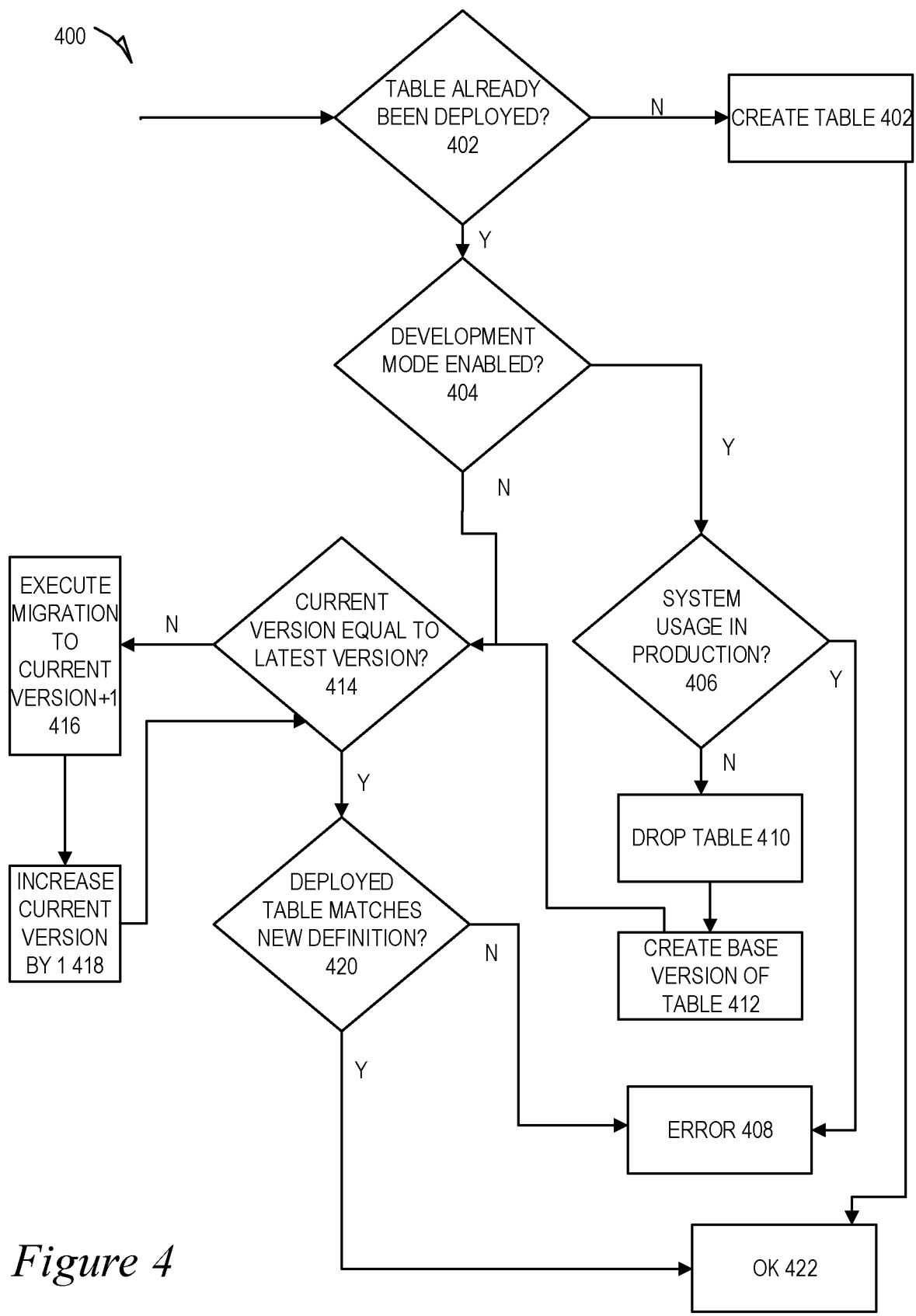
FIG. 4 is a flow diagram illustrating a method of operating a development mode of a database development infrastructure in accordance with an example embodiment.

Should developer 1 then decide to do further work on this definition, at operation 322 the development may start based on the latest definition. Likewise, should developer 2 then decide to do further work on this definition, at operation 324 the development may start based on the latest definition FIG. 4 is a flow diagram illustrating a method 400 of operating a development mode of a database development infrastructure in accordance with an example embodiment. This figure describes what processes are undertaken when a table data structure has its definition updated, but one of ordinary skill in the art would recognize that the same or similar processes can be utilized for other types of data structures.

At operation 402, it is determined if the table is already deployed. If not, then the table can be created (using the newly provided definition) at operation 402. If so, then at operation 404 it is determined if the development mode is enabled. If so, then at operation 406 it is determined if the system usage is in production or not. When a system usage is in production, this means that the database objects, including the table, are actually in use by people other than the developers, e.g., the table whose definition is currently being altered is part of an actively used database currently in use with one or more customers. As described earlier, since the development mode used herein can possibly delete database data, it is unwise to operate in development mode while the system usage is in production. As such, if it is determined at operation 406 that the system usage is in production, then at operation 408 an error is generated. If not, then at operation 410 the current database object for the table is dropped and at operation 412 a base version of the table is created. The developer may then create the new migration or migrations based upon this base version.

Once operation 412 is complete, or if development mode was not enabled at operation 404, at operation 414 it is determined if the current version of the table definition is equal to the latest version. If not, then a migration to the current version plus one will be executed at operation 416. Then, at operation 418 the current version is increased by one and the method 400 loops back to operation 414, which keeps testing whether the current version of the table definition is equal to the latest version until it is. Thus, for example, if the current version of the table definition is at version 6 and the latest version is at version 8, then at operation 416 a migration from version 6 to version 7 is executed and at operation 418 the current version is incremented to version 7, then the evaluation at operation 414 causes the method 400 to repeat to operation 416, which executes a migration from version 7 to version 8, and operation 418 increases the current version to version 8.

Once the current version equals the latest version, then at operation 420 it is determined if the deployed table matches the new definition. If not, then at operation 408 an error is produced. If so, then at operation 422 an OK indication is provided. Notably, an OK indication at operation 422 can also be generated subsequent to operation 402.

Figure 5:
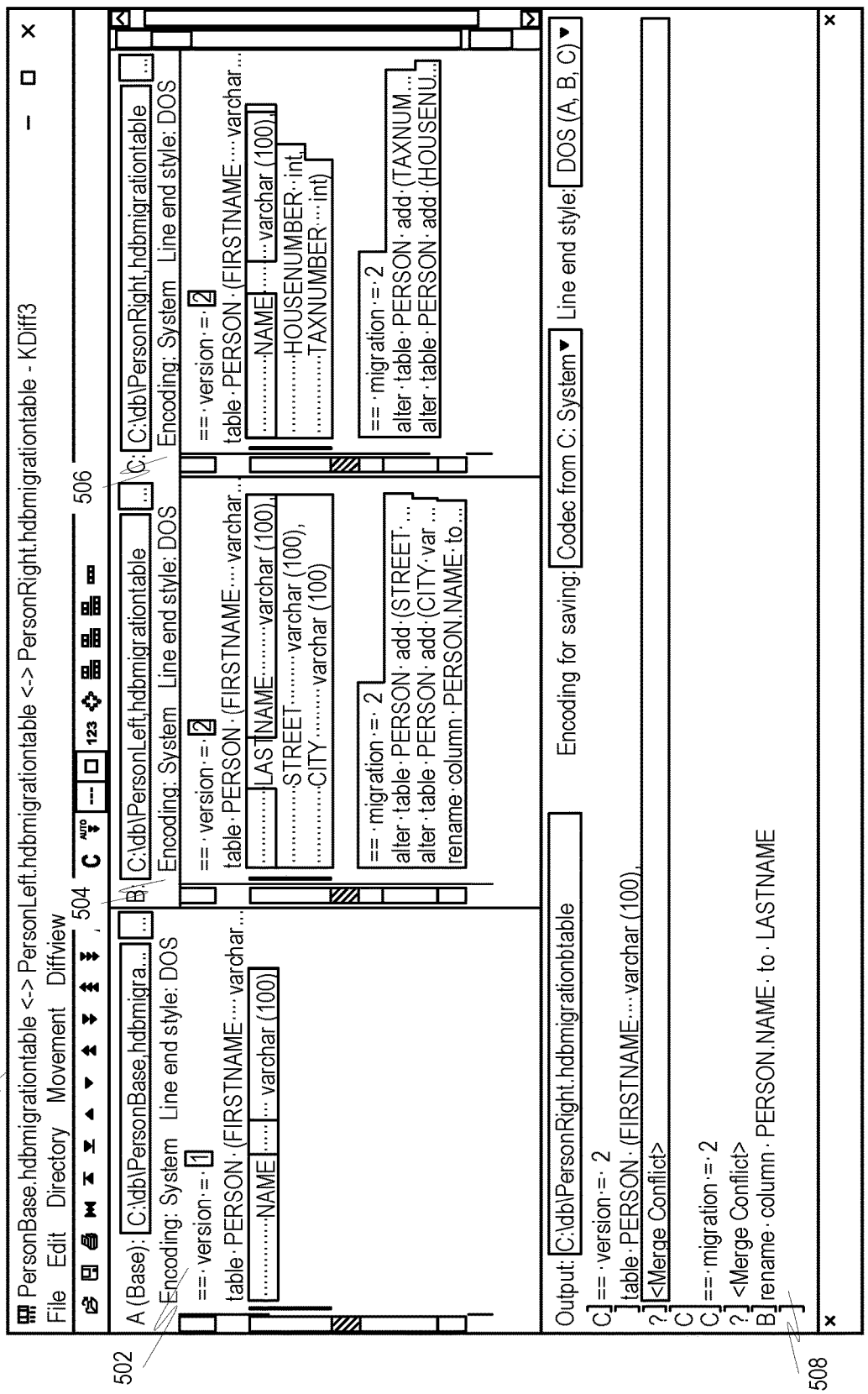
FIG. 5 is a screen capture illustrating a graphical user interface operated by a developer in a development mode of a development infrastructure in accordance with an example embodiment.

FIG. 5 is a screen capture illustrating a graphical user interface 500 operated by a developer in a development mode of a development infrastructure in accordance with an example embodiment. Window 502 depicts the base version of the table definition. Window 504 depicts a version 2 of the table definition as provided by a first developer. Window 506 depicts an alternative version 2 of the table definition as provided by a second developer. Window 508 depicts the output of a migration table, which is showing a conflict in the merging of the table definitions due to conflicts between version 2 and alternative version 2. A merged version of the Person.hdbmigrationtable incorporating both developer B's and C's changes, could then look like this:

```
== version = 2
table PERSON (FIRSTNAME varchar(100),
LASTNAME varchar(100),
STREET varchar(100),
CITY varchar(100),
```

-continued

```
NAME varchar(100),
HOUSENUMBER int,
TAXNUMBER int)
== migration = 2
alter table PERSON add (STREET varchar(100));
alter table PERSON add (CITY varchar(100));
rename column PERSON.NAME to LASTNAME;
alter table PERSON add (TAXNUMBER int);
alter table PERSON add (HOUSENUMBER int);
```

Examples

Example 1. A system comprising:
  at least one hardware processor; and
  a computer-readable medium storing instructions that, when executed by the at least one hardware processor, cause the at least one hardware processor to perform operations comprising:
    receiving a first definition of a data structure in a database;
    determining if an instance of the data structure has been deployed in a first instance of the database;
    in response to a determination that an instance of the data structure has been deployed in the first instance of the database:
      dropping the instance of the data structure that has been deployed in the first instance of the database;
      creating a base version of the data structure in the first instance of the database, the base version corresponding to a second definition of the data structure, the second definition having been committed to a repository, the first definition not having been committed to the repository;
      executing one or more migrations on the base version of the data structure, each of the one or more migrations defining one or more operations performed to modify structure and/or format of the data structure, causing one or more modifications to the base version of the data structure;
      determining whether the modified base version of the data structure matches the second definition of the data structure; and
      in response to a determination that the modified base version of the data structure matches the second definition of the data structure, committing the first definition of the data structure to the repository.

Example 2. The system of Example 1, wherein the operations are performed by a development infrastructure and the repository is external to the development infrastructure.

Example 3. The system of Examples 1 or 2, wherein the operations further comprise:
  in response to a determination that an instance of the data structure has been deployed in the first instance of the database, creating an instance of the data structure in the first instance of the database using the first definition.

Example 4. The system of any of Examples 1-3, wherein the operations further comprise:
  providing, from a version control application, one or more alternative migrations on the base version of the data structure.

Example 5. The system of Example 4, wherein the operations are performed by an instance of a development infrastructure associated with a first developer, and wherein the one or more alternative migrations are obtained from an instance of the development infrastructure associated with a second developer.

Example 6. The system of any of Examples 1-5, wherein the executing the one or more migrations includes sequentially executing migrations associated with transitions between definitions of the data structure, wherein the definitions of the data structure include at least a third definition being a version earlier than the first definition but later than the second definition.

Example 7. The system of any of Examples 1-6, wherein the one or more migrations are stored in a specialized file format including the first definition and the second definition.

Example 8. A method comprising:
  receiving a first definition of a data structure in a database;
  determining if an instance of the data structure has been deployed in a first instance of the database;
  in response to a determination that an instance of the data structure has been deployed in the first instance of the database:
    dropping the instance of the data structure that has been deployed in the first instance of the database;
    creating a base version of the data structure in the first instance of the database, the base version corresponding to a second definition of the data structure, the second definition having been committed to a repository, the first definition not having been committed to the repository;
    executing one or more migrations on the base version of the data structure, each of the one or more migrations defining one or more operations performed to modify structure and/or format of the data structure, causing one or more modifications to the base version of the data structure;
    determining whether the modified base version of the data structure matches the second definition of the data structure; and
    in response to a determination that the modified base version of the data structure matches the second definition of the data structure, committing the first definition of the data structure to the repository.

Example 9. The method of Example 8, wherein the method is performed by a development infrastructure and the repository is external to the development infrastructure.

Example 10. The method of Examples 8 or 9, wherein the method further comprises:
  in response to a determination that an instance of the data structure has been deployed in the first instance of the database, creating an instance of the data structure in the first instance of the database using the first definition.

Example 11. The method of any of Examples 8-10, wherein the method further comprises:
  providing, from a version control application, one or more alternative migrations on the base version of the data structure.

Example 12. The method of Example 11, wherein the method is performed by an instance of a development infrastructure associated with a first developer, and wherein the one or more alternative migrations are obtained from an instance of the development infrastructure associated with a second developer.

Example 13. The method of any of Examples 8-12, wherein the executing the one or more migrations includes sequentially executing migrations associated with transitions between definitions of the data structure, wherein the definitions of the data structure include at least a third definition being a version earlier than the first definition but later than the second definition.

Example 14. The method of any of Examples 8-13, wherein the one or more migrations are stored in a specialized file format including the first definition and the second definition.

Example 15. A non-transitory machine-readable medium storing instructions which, when executed by one or more processors, cause the one or more processors to perform operations comprising:

receiving a first definition of a data structure in a database;
determining if an instance of the data structure has been deployed in a first instance of the database;
in response to a determination that an instance of the data structure has been deployed in the first instance of the database:
dropping the instance of the data structure that has been deployed in the first instance of the database;
creating a base version of the data structure in the first instance of the database, the base version corresponding to a second definition of the data structure, the second definition having been committed to a repository, the first definition not having been committed to the repository;
executing one or more migrations on the base version of the data structure, each of the one or more migrations defining one or more operations performed to modify structure and/or format of the data structure, causing one or more modifications to the base version of the data structure;
determining whether the modified base version of the data structure matches the second definition of the data structure; and
in response to a determination that the modified base version of the data structure matches the second definition of the data structure, committing the first definition of the data structure to the repository.

Example 16. The non-transitory machine-readable medium of Example 15, wherein the operations are performed by a development infrastructure and the repository is external to the development infrastructure.

Example 17. The non-transitory machine-readable medium of Examples 15 or 16, wherein the operations further comprise:

in response to a determination that an instance of the data structure has been deployed in the first instance of the database, creating an instance of the data structure in the first instance of the database using the first definition.

Example 18. The non-transitory machine-readable medium of any of Examples 15-17, wherein the operations further comprise:

providing, from a version control application, one or more alternative migrations on the base version of the data structure.

Example 19. The non-transitory machine-readable medium of Example 18, wherein the operations are performed by an instance of a development infrastructure associated with a first developer, and wherein the one or more alternative migrations are obtained from an instance of the development infrastructure associated with a second developer.

Example 20. The non-transitory machine-readable medium of any of Examples 15-19, wherein the executing the one or more migrations includes sequentially executing migrations associated with transitions between definitions of the data structure, wherein the definitions of the data structure include at least a third definition being a version earlier than the first definition but later than the second definition.

Figure 6:
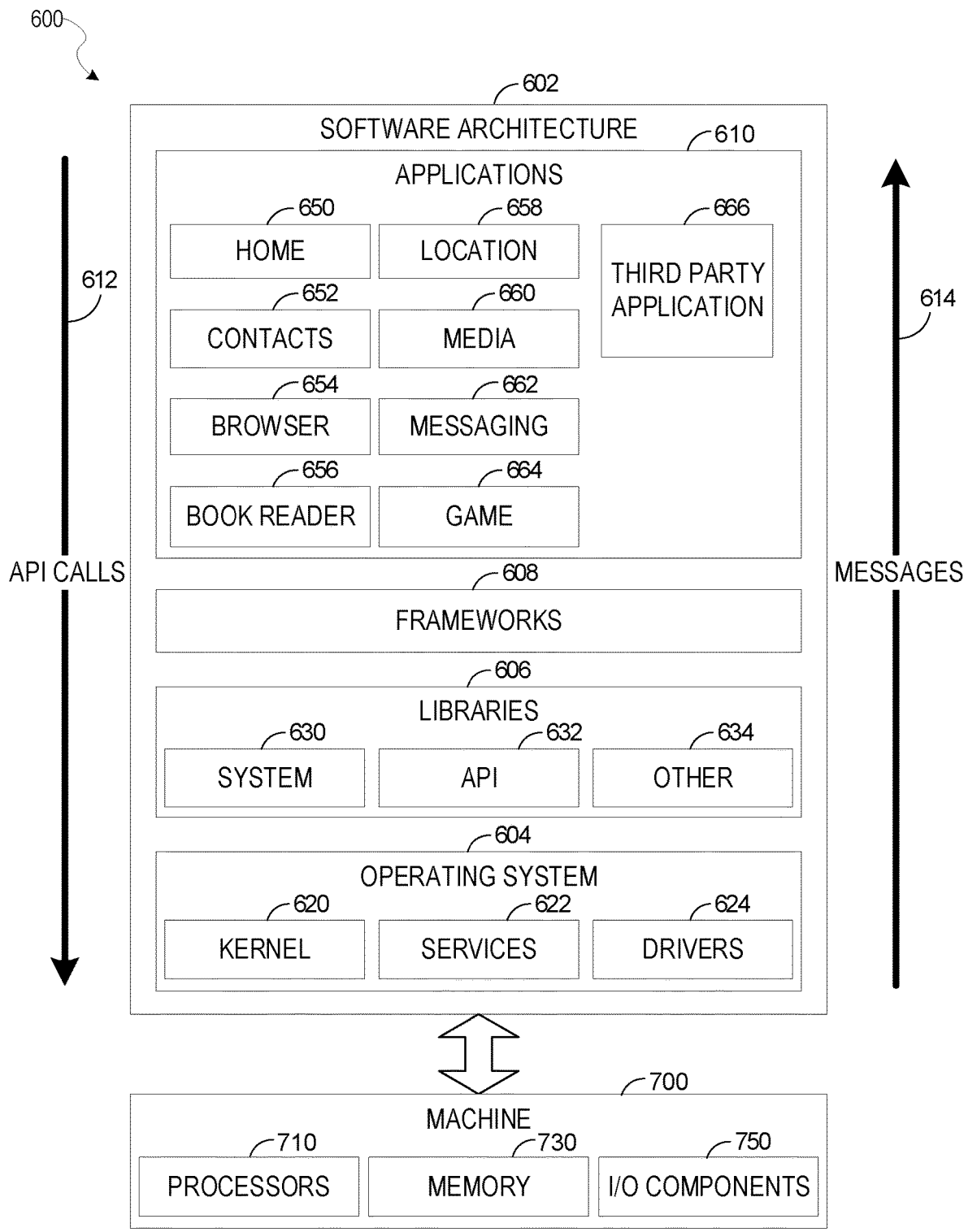
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 666 can invoke the API calls 612 provided by the operating system 604 to facilitate functionality described herein.

Figure 7:
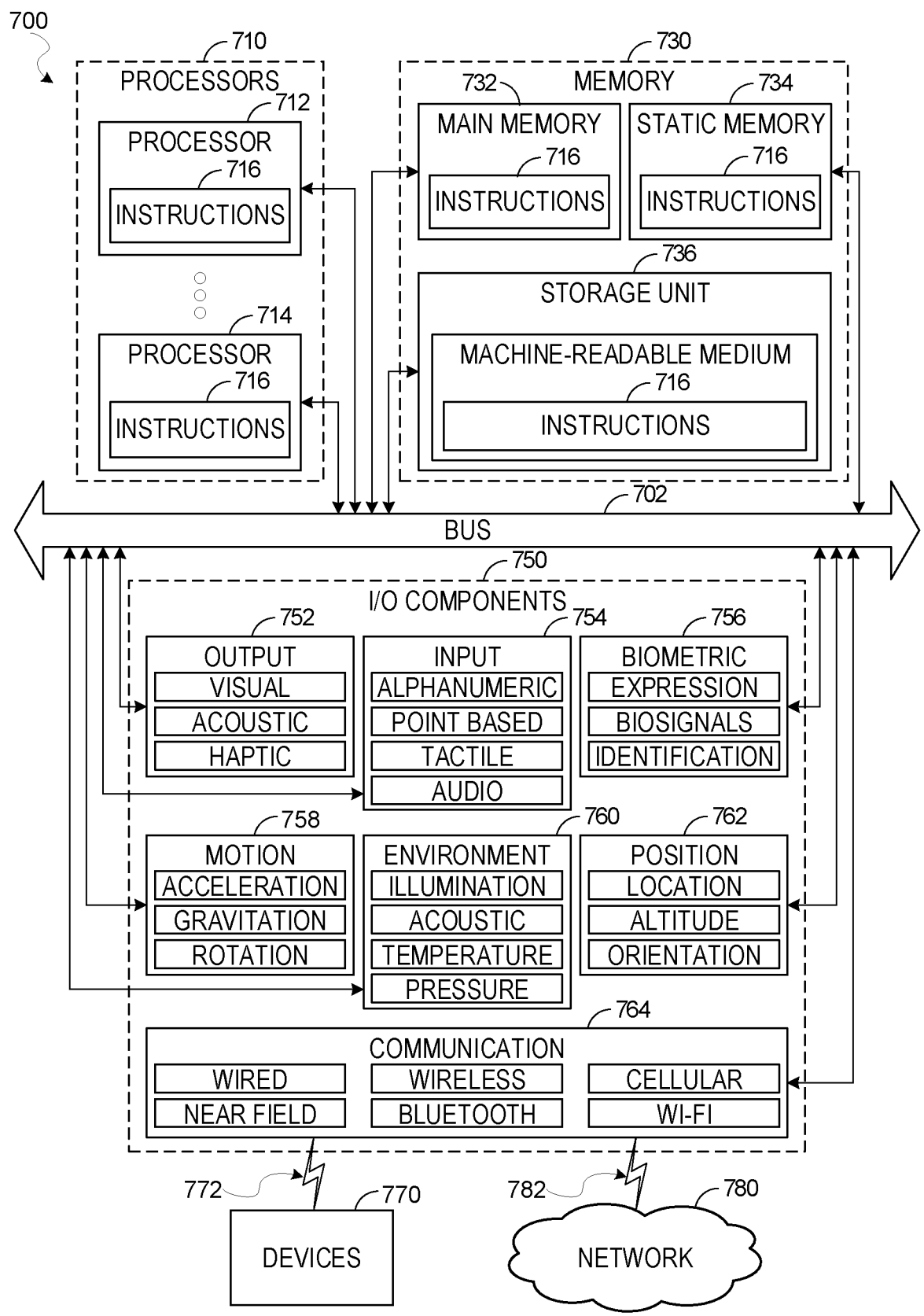
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 400 of FIG. 4. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks, magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
receiving a first definition of a data structure in a database;
determining if an instance of the data structure has been deployed in a first instance of the database;
in response to a determination that an instance of the data structure has been deployed in the first instance of the database:
dropping the instance of the data structure that has been deployed in the first instance of the database;
creating a base version of the data structure in the first instance of the database, the base version corresponding to a second definition of the data structure, the second definition having been committed to a repository, the first definition not having been committed to the repository;
executing one or more migrations on the base version of the data structure, each of the one or more migrations defining one or more operations performed to modify structure and/or format of the data structure, causing one or more modifications to the base version of the data structure;
determining whether the modified base version of the data structure matches the second definition of the data structure; and
in response to a determination that the modified base version of the data structure matches the second definition of the data structure, committing the first definition of the data structure to the repository,
wherein the operations are performed by a development infrastructure and the repository is external to the development infrastructure.

2. The system of claim 1, wherein the operations further comprise:
in response to a determination that an instance of the data structure has been deployed in the first instance of the database, creating an instance of the data structure in the first instance of the database using the first definition.

3. The system of claim 1, wherein the operations further comprise:
providing, from a version control application, one or more alternative migrations on the base version of the data structure.

4. The system of claim 3, wherein the operations are performed by an instance of a development infrastructure associated with a first developer, and wherein the one or more alternative migrations are obtained from an instance of the development infrastructure associated with a second developer.

5. The system of claim 1, wherein the executing the one or more migrations includes sequentially executing migrations associated with transitions between definitions of the data structure, wherein the definitions of the data structure include at least a third definition being a version earlier than the first definition but later than the second definition.

6. The system of claim 1, wherein the one or more migrations are stored in a specialized file format including the first definition and the second definition.

7. A method comprising:
receiving a first definition of a data structure in a database;
determining if an instance of the data structure has been deployed in a first instance of the database;
in response to a determination that an instance of the data structure has been deployed in the first instance of the database:
dropping the instance of the data structure that has been deployed in the first instance of the database;
creating a base version of the data structure in the first instance of the database, the base version corresponding to a second definition of the data structure, the second definition having been committed to a repository, the first definition not having been committed to the repository;
executing one or more migrations on the base version of the data structure, each of the one or more migrations defining one or more operations performed to modify structure and/or format of the data structure, causing one or more modifications to the base version of the data structure;
determining whether the modified base version of the data structure matches the second definition of the data structure; and
in response to a determination that the modified base version of the data structure matches the second definition of the data structure, committing the first definition of the data structure to the repository,
wherein the method is performed by a development infrastructure and the repository is external to the development infrastructure.

8. The method of claim 7, wherein the method further comprises:
in response to a determination that an instance of the data structure has been deployed in the first instance of the database, creating an instance of the data structure in the first instance of the database using the first definition.

9. The method of claim 7, wherein the method further comprises:
providing, from a version control application, one or more alternative migrations on the base version of the data structure.

10. The method of claim 9, wherein the method is performed by an instance of a development infrastructure associated with a first developer, and wherein the one or more alternative migrations are obtained from an instance of the development infrastructure associated with a second developer.

11. The method of claim 7, wherein the executing the one or more migrations includes sequentially executing migrations associated with transitions between definitions of the data structure, wherein the definitions of the data structure include at least a third definition being a version earlier than the first definition but later than the second definition.

12. The method of claim 7, wherein the one or more migrations are stored in a specialized file format including the first definition and the second definition.

13. A non-transitory machine-readable medium storing instructions which, when executed by one or more processors, cause the one or more processors to perform operations comprising:

receiving a first definition of a data structure in a database;

determining if an instance of the data structure has been deployed in a first instance of the database;

in response to a determination that an instance of the data structure has been deployed in the first instance of the database:

dropping the instance of the data structure that has been deployed in the first instance of the database;

creating a base version of the data structure in the first instance of the database, the base version corresponding to a second definition of the data structure, the second definition having been committed to a repository, the first definition not having been committed to the repository;

executing one or more migrations on the base version of the data structure, each of the one or more migrations defining one or more operations performed to modify structure and/or format of the data structure, causing one or more modifications to the base version of the data structure;

determining whether the modified base version of the data structure matches the second definition of the data structure; and in response to a determination that the modified base version of the data structure matches the second definition of the data structure, committing the first definition of the data structure to the repository, wherein the operations are performed by a development infrastructure and the repository is external to the development infrastructure.

14. The non-transitory machine-readable medium of claim 13, wherein the operations further comprise:

in response to a determination that an instance of the data structure has been deployed in the first instance of the database, creating an instance of the data structure in the first instance of the database using the first definition.

15. The non-transitory machine-readable medium of claim 13, wherein the operations further comprise:

providing, from a version control application, one or more alternative migrations on the base version of the data structure.

16. The non-transitory machine-readable medium of claim 15, wherein the operations are performed by an instance of a development infrastructure associated with a first developer, and wherein the one or more alternative migrations are obtained from an instance of the development infrastructure associated with a second developer.

17. The non-transitory machine-readable medium of claim 13, wherein the executing the one or more migrations includes sequentially executing migrations associated with transitions between definitions of the data structure, wherein the definitions of the data structure include at least a third definition being a version earlier than the first definition but later than the second definition.

* * * * *